United States Patent
Götz et al.

(10) Patent No.: US 10,135,266 B2
(45) Date of Patent: Nov. 20, 2018

(54) BATTERY SYSTEM FOR MOTOR VEHICLE WITH LOSS-FREE SWITCHING AND AUTOMATIC CHARGE EQUALIZATION

(71) Applicant: Dr. Ing. h.c. F. Porsche Aktiengesellschaft, Stuttgart (DE)

(72) Inventors: Stefan Götz, Forstern (DE); Ulf Schlieben, Ditzingen (DE); Sven Lill, Lauffen (DE); Ralf Bauer, Neckarsulm (DE); Harald Schöffler, Obersulm-Eschenau (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 146 days.

(21) Appl. No.: 15/289,539

(22) Filed: Oct. 10, 2016

(65) Prior Publication Data

US 2017/0110894 A1   Apr. 20, 2017

(30) Foreign Application Priority Data

Oct. 19, 2015 (DE) .......................... 10 2015 117 744

(51) Int. Cl.
*H01M 10/44* (2006.01)
*H01M 10/46* (2006.01)
(Continued)

(52) U.S. Cl.
CPC ......... *H02J 7/0019* (2013.01); *B60L 11/1861* (2013.01); *B60L 11/1866* (2013.01);
(Continued)

(58) Field of Classification Search
CPC ...... H02J 7/1423; H02J 7/0013; H02J 7/0014; H02J 7/0024; H02J 7/345
(Continued)

(56) References Cited

U.S. PATENT DOCUMENTS

| 6,121,751 A | 9/2000 | Merritt |
| 8,536,824 B2 * | 9/2013 | St-Jacques ............ H02J 7/0016 320/103 |

(Continued)

FOREIGN PATENT DOCUMENTS

| DE | 3247707 | 6/1984 |
| DE | 295450 | 10/1991 |

(Continued)

OTHER PUBLICATIONS

German Search Report for German Application No. 10 2015 117 744.7 with partial translation, 9 pages.

(Continued)

*Primary Examiner* — Edward Tso
(74) *Attorney, Agent, or Firm* — RatnerPrestia

(57) ABSTRACT

A battery system having a battery having at least one first battery element, at least one second battery element and a center tap between the at least one first and the at least one second battery element, a power changeover switch having a plurality of switching elements for changing over between the at least one first battery element and the at least one second battery element, and at least one pair of output terminals that is electrically connected to the battery, wherein the center tap has a first capacitive store arranged on it that has a store voltage that appears over an appropriate period in accordance with a first and/or second battery element voltage provided by the first and/or second battery element, wherein during the period in which the store voltage appears, a store current decreases from a maximum value to a value of zero.

25 Claims, 6 Drawing Sheets

(51) Int. Cl.
*H02J 7/00* (2006.01)
*B60L 11/18* (2006.01)
*H02J 7/34* (2006.01)

(52) U.S. Cl.
CPC ... *B60L 2240/547* (2013.01); *B60L 2240/549* (2013.01); *B60L 2240/80* (2013.01); *H02J 7/345* (2013.01)

(58) Field of Classification Search
USPC .............................. 320/107, 116, 118, 166
See application file for complete search history.

(56) References Cited

U.S. PATENT DOCUMENTS

| | | | |
|---|---|---|---|
| 2014/0139184 | A1 | 5/2014 | De Vries |
| 2014/0211520 | A1 | 7/2014 | Zhang |
| 2014/0334201 | A1 | 11/2014 | Sutardja |
| 2015/0036253 | A1 | 2/2015 | Wang |

FOREIGN PATENT DOCUMENTS

| | | |
|---|---|---|
| DE | 102011077664 | 12/2012 |
| DE | 102013001466 | 7/2014 |
| DE | 102014012068 | 3/2015 |
| EP | 0584622 | 3/1994 |
| EP | 1901412 | 3/2008 |
| EP | 2053717 | 4/2009 |
| EP | 2413455 | 2/2012 |
| EP | 2506390 | 10/2012 |
| WO | 2013037633 | 3/2013 |

OTHER PUBLICATIONS

English translation of Japanese Office Action in corresponding application No. 2016-197002, dated Nov. 8, 2017, 4 pages.
Korean Notice of Preliminary Rejection for Korean Application No. 10-2016-0135298, dated Jul. 23, 2018, 4 pages.

\* cited by examiner

BATTERY SYSTEM FOR MOTOR VEHICLE WITH LOSS-FREE SWITCHING AND AUTOMATIC CHARGE EQUALIZATION

CROSS-REFERENCE TO RELATED APPLICATIONS

This application claims priority to German Patent Application No. DE 10 2015 117 744.7, filed Oct. 19, 2015, which is incorporated by reference herein in its entirety.

FIELD OF THE INVENTION

The invention relates to a battery system that essentially allows loss-free switching and provides automatic charge equalization.

BACKGROUND OF THE INVENTION

Electrically driven vehicles are normally equipped with a battery that provides the necessary electric power for operating the vehicle. In this case, the battery may be constructed from a plurality of battery elements or battery cells that each provide a corresponding battery element voltage. One problem for batteries constructed from a plurality of battery elements is even loading of the battery elements during operation. Complex circuits can allow even loading of the battery elements.

Furthermore, changeover between different pairs of battery taps is a critical process that requires appropriate precautions in the circuit design and thereby gives rise to costs. Changeover causes switching losses and, on account of the limited changeover speed, requires complex protective circuitry for the switching elements (for example semiconductors) that channel off overvoltages and maintain the flow of current during changeover. In addition, changeover processes are a main reason for electromagnetic compatibility (EMC) problems as a result of the transmission of electrical waves. Insulated gate electrode bipolar transistors (IGBT), in particular, have a slow switch-off response (what are known as tail currents) and enforce long switching gaps (idle times) in the changeover between multiple pairs of battery taps. In typical high voltage circuits in motor vehicles, which also include motor inverters, for example, switching losses exceed pure resistive losses or line losses in the semiconductors.

In a first approximation, the switching losses are made up of two components. A first component is approximately proportional to the current and voltage during changeover.

On account of the high voltage of several hundred volts (for example 400 V or 800 V), it is additionally possible for capacitive charge reversal effects, for example on the junction capacitances of the semiconductors, to lose significant weight owing to a quadratic dependency on the voltage. The switching losses can be determined by the following formula:

$$E_{switching\ loss} = \sum_{j\in \Delta s_j} \underbrace{\frac{1}{2}I^{(j)}V_m^{(j)}(t_{on}+t_{off})}_{saturation\ losses} + \underbrace{\frac{1}{2}(C_{gd}+C_{ds})(V_m^{(j)})^2}_{junction\ capacitances}$$

DE 10 2011 077 664 A1, which is incorporated by reference herein, discloses an energy storage system having multiple series-connected storage devices and a device for evening the states of charge of the individual storage devices, which comprise at least one DC/DC voltage converter (DC/DC converter).

DE 10 2013 001 466 A1, which is incorporated by reference herein, discloses a battery having multiple battery cells, wherein each battery cell contains a discharge circuit and a supplementary circuit for opening a discharge switch when a critical limit voltage for the respective battery cell is undershot.

DE 10 2014 012 068 A1, which is incorporated by reference herein, discloses a method for heating a battery having a series circuit comprising a plurality of battery cells, wherein a start and an end of the series circuit are coupled via a capacitive store.

EP 2 506 390 A1, which is incorporated by reference herein, discloses a battery controller for a battery having multiple battery cells, wherein each battery cell has an associated circuit for voltage measurement that has a capacitor. The battery controller can change over between the individual battery cells depending on the state of charge.

EP 1 901 412 A2, which is incorporated by reference herein, discloses a battery management system for a battery having multiple battery cells, wherein each battery cell has an apparatus for charging and is charged or discharged depending on the state of charge.

EP 2 053 717 A2, which is incorporated by reference herein, discloses a discharge controller for a battery having multiple battery cells, wherein each battery cell has a discharge circuit and apparatuses for voltage measurement. In addition, a switching apparatus and a control unit are present between the various battery cells.

WO 2013 037 633 A2, which is incorporated by reference herein, discloses a method for equalizing charge differences between battery modules in a battery system. In this case, when the battery system is discharged, energy is stored in an intermediate-circuit capacitor and supplied therefrom to a battery module having a low state of charge.

As can be seen from the formula shown above, current and voltage on a semiconductor at a changeover time are definitive in determining switching losses. If one of these or both is/are negligibly small for individual switching elements at the switching time, switching losses can be effectively reduced, this allowing the switching losses to be kept down even at high switching rates. One object that the present invention addresses is at least a reduction in or even complete elimination of switching losses.

SUMMARY OF THE INVENTION

It is intended to be understood that, subsequently, the term "battery", as used within the context of the invention, covers a plurality of primary cells, secondary cells and/or capacitors, particularly including film capacitors, electrolytic capacitors, double layer capacitors and ceramic capacitors.

The Battery System According to Aspects of the Invention Comprises:

- a battery having at least one first battery element, at least one second battery element and a center tap between the at least one first and the at least one second battery element,
- a power changeover switch having a plurality of switching elements for changing over between the at least one first battery element and the at least one second battery element, and
- at least one pair of output terminals that is electrically connected to the battery, wherein the center tap has a first capacitive store arranged on it that has a store voltage that appears over an appropriate period in accordance with a first and/or second battery element voltage provided by the first and/or second battery element, wherein during the period in which the store voltage appears, a store current decreases from a maximum value to a value of zero, wherein changeover of at least one from the plurality of switching elements for the purpose of changeover from the at least one first battery element to the at least one second battery element can be performed at the time at which the store current is essentially zero and the store voltage has essentially reached a maximum value.

In one embodiment of the battery system according to aspects of the invention, the switching elements are low frequency changeover switches.

In one embodiment of the battery system according to aspects of the invention, at least one output terminal from the at least one pair of output terminals has at least one first inductance.

In a further embodiment of the battery system according to aspects of the invention, the at least one pair of output terminals has a second capacitive store arranged between them.

In yet a further embodiment of the battery system according to aspects of the invention, the second capacitive store is arranged upstream or downstream of the respective at least one first inductance of the output terminals each time.

In one embodiment of the battery system according to aspects of the invention, the second capacitive store is a polar capacitor having a positive pole and a negative pole.

In a further embodiment of the battery system according to aspects of the invention, each output terminal from the at least one pair of output terminals has a second inductance, wherein the second capacitive store is arranged between the first and second inductances.

In yet a further embodiment of the battery system according to aspects of the invention, the first capacitive store has a voltmeter for measuring the store voltage arranged on it.

In one embodiment of the battery system according to aspects of the invention, a threshold value switch receives the measured store voltage, wherein the threshold value switch instructs a switch controller to change over at least one low frequency changeover switch from the plurality of low frequency changeover switches as soon as the store voltage reaches an upper or lower changeover threshold value.

In a further embodiment of the battery system according to aspects of the invention, a differentiator receives and processes the value of the measured store voltage, wherein the processed value can be forwarded to a threshold value switch that instructs a switch controller to switch at least one low frequency changeover switch from the plurality of low frequency changeover switches as soon as the processed value reaches an upper or lower changeover threshold value.

In yet a further embodiment of the battery system according to aspects of the invention, the value of the measured store voltage can be supplied to a differentiator and a combinational mathematics unit, wherein a switch controller ascertains a first factor for a mode of the battery system in a present circuit state and ascertains a second factor for a mode of the battery system in a circuit state after a changeover, wherein the switch controller is configured to instruct the low frequency changeover switches or the power changeover switch to set the mode of the battery system for which the ascertained factor is lower.

In one embodiment of the battery system according to aspects of the invention, the switch controller is configured to assess the cost value for a period in the future.

In a further embodiment of the battery system according to aspects of the invention, the period is between approximately one millisecond and approximately five seconds in the future.

Furthermore, a method for low-loss or loss-free changeover of at least one switching element in a battery system having a battery comprising (or consisting of) at least one first battery element, at least one second battery element and a center tap, a power changeover switch having the at least one switching element and at least one pair of output terminals that is connected to the battery is proposed, in which the center tap is assigned a capacitive store that is charged to a store voltage over an appropriate period using a voltage element that is provided by the first and/or second battery element, wherein during the period in which the store voltage is charged, a store current decreases from a maximum value to a value of zero, wherein changeover of at least one from the plurality of switching elements for the purpose of changeover from the at least one first battery element to the at least one second battery element is performed at the time at which the store current is essentially zero and the store voltage has essentially reached a maximum value.

In one embodiment of the method according to aspects of the invention, the switching elements used are low frequency changeover switches.

In a further embodiment of the method according to aspects of the invention, the at least one pair of output terminals has an approximately constant and smooth voltage provided on it by arranging at least one inductance on at least one output terminal from the at least one pair of output terminals.

In yet a further embodiment of the method according to aspects of the invention, the at least one pair of output terminals has a second capacitive store arranged between them.

In one embodiment of the method according to aspects of the invention, the second capacitive store is arranged upstream or downstream of the respective at least one first is inductance each time.

In a further embodiment of the method according to aspects of the invention, the second capacitive store used is a polar capacitor having a positive pole and a negative pole.

In yet a further embodiment of the method according to aspects of the invention, at least one output terminal has at least one second inductance arranged on it and the second capacitive store is arranged between the first and the second inductance.

In one embodiment of the method according to aspects of the invention, the first capacitive store has a voltmeter for measuring a store voltage arranged on it.

In a further embodiment of the method according to aspects of the invention, a threshold value switch receives the measured store voltage, wherein the threshold value switch instructs a switch controller to change over at least one switching element from the plurality of switching elements as soon as the store voltage reaches an upper or a lower changeover threshold value.

In yet a further embodiment of the method according to aspects of the invention, a differentiator receives and processes the value of the measured store voltage, wherein the processed value is forwarded to a threshold value switch that instructs a switch controller to change over at least one switching element from the plurality of switching elements as soon as the processed value reaches an upper or a lower changeover threshold value.

In one embodiment of the method according to aspects of the invention, the value of the measured store voltage is supplied to a differentiator and a combinational mathematics unit, wherein a switch controller ascertains a factor for a mode of an embodiment of a battery system according to aspects of the invention in a present circuit state and a factor for a mode of an embodiment of a battery system according to aspects of the invention in a circuit state after a changeover, wherein the switch controller instructs the switching elements or the power changeover switch to set the mode of the embodiment of the battery system according to aspects of the invention for which the ascertained factor is lower.

In a further embodiment of the method according to aspects of the invention, the switch controller assesses the factor for a period in the future.

Further advantages and refinements of the invention will emerge from the description and the accompanying drawings.

It goes without saying that the features cited above and those yet to be explained below can be used not only in the respectively indicated combination but also in other combinations or on their own without departing from the scope of the present invention.

BRIEF DESCRIPTION OF THE DRAWINGS

The invention is shown schematically in the drawing on the basis of embodiments and is described schematically and in detail with reference to the drawing.

FIG. 3b shows a graph that represents the time profile of a store voltage in accordance with the profile of the store current from FIG. 3a.

DETAILED DESCRIPTION OF THE INVENTION

The detailed description that follows provides a more detailed description of the battery system according to aspects of the invention and the method according to aspects of the invention.

Figure 1:
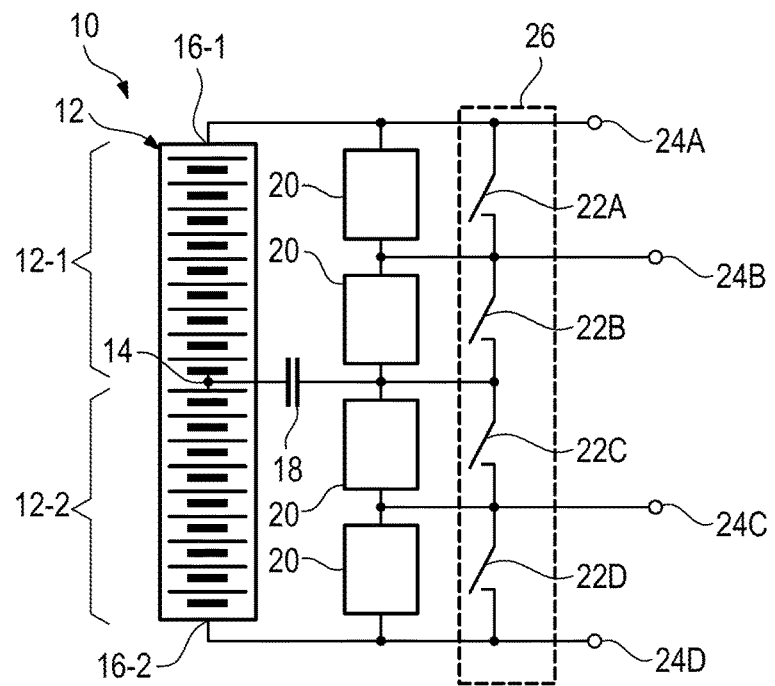
FIG. 1 shows a basic circuit for an embodiment of a battery system according to aspects of the invention.

A basic circuit for the battery system 10 according to aspects of the invention will be presented with reference to FIG. 1. The battery system 10 has a battery 12. The battery 12 has a first battery element 12-1 and a second battery element 12-2. The first battery element 12-1 and the second battery element 12-2 may for their part be constructed from a plurality of battery elements or battery cells. The first battery element 12-1 and the second battery element 12-2 have a center tap 14 arranged between them. Furthermore, the battery 12 has a first battery tap 16-1 and a second battery tap 16-2. The center tap 14 has an associated capacitive store 18. In the embodiment shown, the capacitive store 18 is a capacitor. From the electrical branch that has the center tap 14 and the capacitor 18, an electrical connection branches to the electrical branch with the first battery tap 16-1 and an electrical connection branches to the branch with the second battery tap 16-2. Each of these electrical connections has two "discharge networks" 20, so that a total of four discharge networks 20 are connected up in the battery system 10. Connected in parallel with each discharge network 20 is a respective switching element 22A to 22D. The switching elements 22A to 22D define a power changeover switch 26. Suitable switching elements are, in principle, any type of electrical or electronic switching elements, particularly even semiconductor switching elements.

The discharge networks 20 represent protective circuitry for the switching elements 22A to 22D. Other expressions in the literature therefor are discharge circuit or snubber. The discharge networks 20 prevent voltage spikes that can arise when a switching element 22A to 22D is closed and/or opened. Suitable protective circuitry is sufficiently well known from the literature, for example from EP 0 584 622 A1, DD 295 450 A5, DE 32 47 707 A1, US 2015/0036253 or US 2014/0334201, each of which is incorporated by reference herein, and is being progressively improved to the advantage of the invention.

In addition, the basic circuit of the battery system 10 has four output terminals 24A to 24D. The four output terminals 24A to 24D normally form pairs. Provision is made for the output terminals 24A and 24D to form one pair and for the output terminals 24B and 24C to form one pair. The switching elements 22A to 22D can be used to electrically connect the output terminals 24A to 24D dynamically or dynamically alternately to the battery taps 16-1, 16-2, 14.

On account of the current flowing in or out, the capacitive store 18 is charged such that the voltage difference driving the current becomes zero, as a result of which the current also ceases and/or commutates (that is to say changes polarity). At this time, the changeover can take place with minimum losses. The driving voltage difference is the charging voltage from the charging column, for example, in the case of a charging process for charging the battery 12; when the battery 12 is discharged, it is the vms voltage as the sum of the battery element voltages and the capacitive store 18, for example.

The basic circuit accordingly ensures that the current ceases (or commutates) after a while in each switch state, or the voltage across one or more switching elements falls until it becomes zero. Hence, switching losses can be reduced or eliminated if, during a changeover time, either current and/or voltage across at least some switching elements to be switched were minimal or even zero. Such a switching response is normally called zero-voltage switching (ZVS— i.e. the voltage is zero or close to zero) or zero-current switching (ZCS—i.e. the current is zero or close to zero). In the embodiments shown, the invention provides for the switching elements to be changed over at an absolute value of the current and/or of the voltage that is close to zero, particularly at an absolute value of the current and/or of the voltage that is less than one fifth of the respective rated value, preferably less than one fiftieth of the respective rated value.

Figure 2:
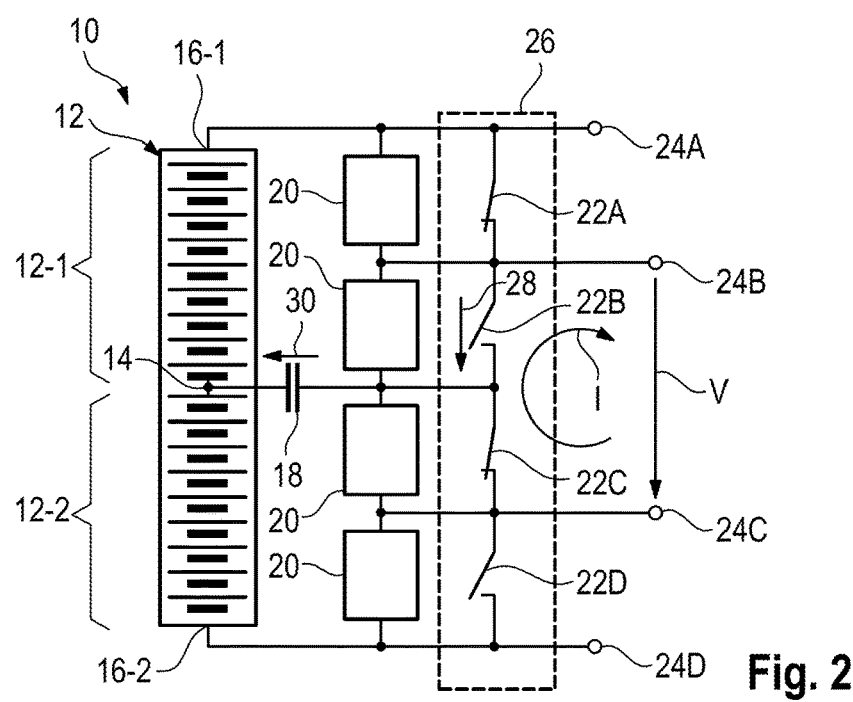
FIG. 2 shows an exemplary circuit state for the battery system according to aspects of the invention from FIG. 1.
Figure 3A:
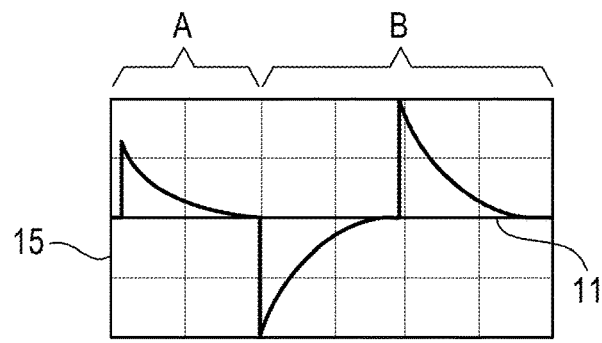
FIG. 3a shows a graph that represents the time profile of a store current.
Figure 3B:
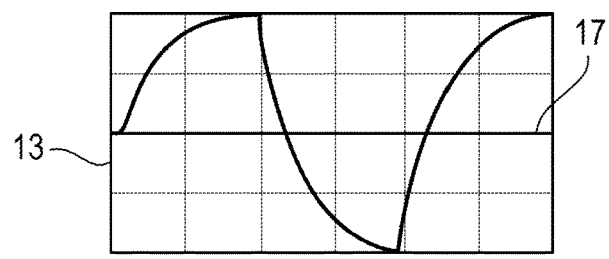

FIG. 2 shows an exemplary switching state of the battery system 10 in which the switching elements 22A and 22C are activated, that is to say closed. The switching elements 22B and 22D are deactivated, that is to say open. The output terminal pair with the output terminals 24B and 24C is accordingly connected to the reduced voltage of the voltage element that is provided by the battery element 12-1. In this case, the capacitive store 18, which in this case is a capacitor, is charged or discharged on any flow of current. A time profile of the current and the voltage of the capacitor 18 is shown in FIGS. 3a and 3b, section A denoting an initial range for an uncharged capacitor 18 and section B denoting a steady-state range. In the circuit state shown, power is drawn from the battery 12 and the capacitor 18 is charged, as a result of which the voltage at the common circuit node between the switching elements 22B and 22C rises in the direction of the battery 12, as indicated by the arrow 30. However, this means that the voltage across the open switch 22B falls, as indicated by the arrow 28, and the voltage V on the battery taps 14, 16-1 falls to zero. As a result of the falling voltage V, the current I also falls. If no changeover takes place, then the current I ceases completely.

Once the voltage on the battery taps 14, 16-1 reaches more or less 0 volts or close to 0 volts, only a negligible current then flows. At the same time, the capacitor 18 is charged almost exactly to the voltage of the battery element 12-1, however. The length of time for which the capacitor 18 is charged is dependent on the current drawn and the capacitance of the capacitor 18. If changeover to the battery element 12-2 occurs in this state, that is to say at a voltage of close to zero across the open switch 22B, then the corresponding voltage from the battery element 12-2 and the voltage from the capacitor 18 are initially applied to the pair of output terminals 24B, 24C, with the voltage of the capacitor 18 initially corresponding to the voltage of the battery element 12-1. Consequently, in the event of a changeover for a battery 12 having two battery elements 12-1, 12-2, the "starting value" on the pair of output terminals 24B, 24C is to the entire voltage that can be provided by the battery 12. To connect the output terminal pair having the output terminals 24B, 24C to the battery element 12-2, the switching elements 22A and 22C would need to be open and the switching elements 22B and 22D would need to be closed.

In the new switching state, however, the capacitor 18 has its charge reversed, as a result of which the voltage initially falls and charges the capacitor 18 again for the inverse polarity, as can be seen in FIG. 3b, in which the profile of the voltage is plotted on the is ordinate 13 over the time on the abscissa 17. This occurs until the current at the capacitor 18 has ceased, see FIG. 3a, in which the profile of the current is plotted on the ordinate 15 over the time on the abscissa 11. If the absolute value of the current is considered in FIG. 3a, the profile corresponds to the current at the pair of output terminals 24B, 24C and to the voltage on the pair of output terminals 24B, 24C.

Figure 4:
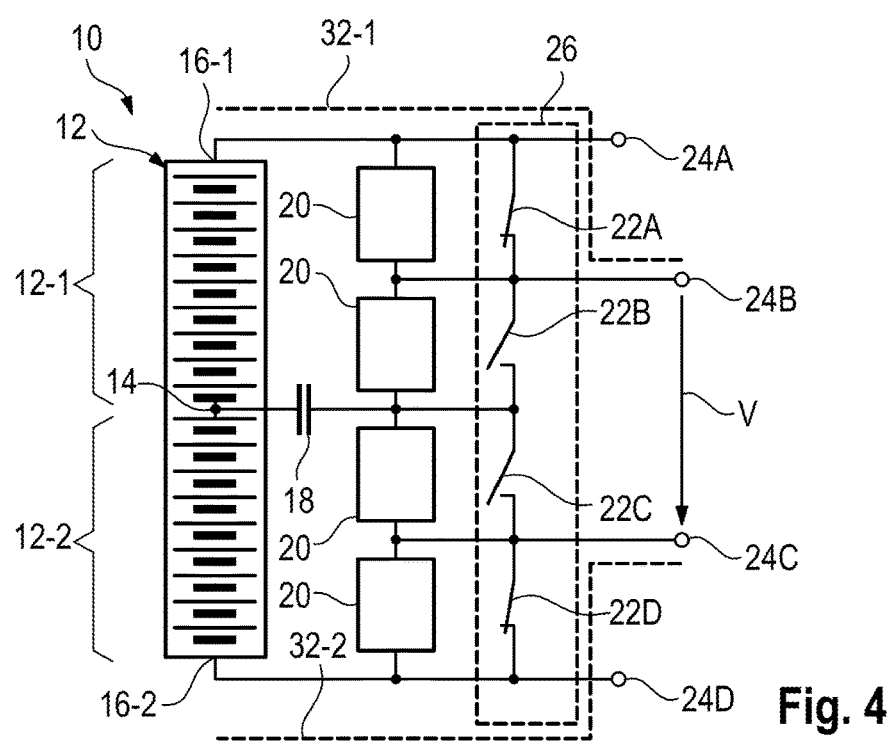
FIG. 4 shows a further exemplary circuit state for the battery system according to aspects of the invention from FIG. 1.

FIG. 4 shows a further circuit state for the basic circuit of the battery system 10. In the case of the circuit state shown, the switching elements 22A and 22D are activated, that is to say closed, and the switching elements 22B and 22C are deactivated, that is to say open. In this circuit state, the pair of output terminals 24B, 24C can be connected not only to a voltage element from a battery element 12-1, 12-2 but also to the complete voltage from the battery 12. In this case, the dashed lines 32-1 and 32-2 represent the current path and clarify the electrical connection of the output terminals 24B, 24C to the battery taps 16-1 and 16-2 for the purpose of providing the complete battery voltage.

Besides the changeover of the switching elements 22A to 22D when the current is small or even has ceased, as a result of which the switching losses can be reduced almost arbitrarily, the result of the capacitive coupling of the battery 12 is that the battery elements 12-1, 12-2 are automatically evenly loaded without there being a requirement for complex charge-based regulation. Furthermore, at a sufficiently high switching rate, very small and inexpensive capacitors can be used as capacitive store 18. A high switching rate additionally has the advantage that a battery management system does not detect relatively long uneven loading on the battery elements 12-1, 12-2 and initiate appropriate countermeasures. Firstly, the high switching rate means that the respective charges drawn or loaded are very small, and secondly, the duration of uneven charging or discharging of the battery elements 12-1, 12-2 is so short that it may possibly even be below an averaging measurement filter of typical battery management systems. Particularly in the case of semiconductor switching elements, which usually prompt long tail currents or reverse recovery effects on switch-off (for example IGBT), the small current during the changeover process caters for fast and low-loss changeover that would otherwise not be possible with these components. The ceased current additionally allows the use of semiconductors as switching elements 22A, 22B, 22C, 22D, which cannot be switched off electronically but rather require current commutation for switch-off, such as thyristors/SCRs or Triacs, for example.

Although the battery 12 is split, that is to say quantized, the battery system 10 according to aspects of the invention can be used to produce arbitrary voltages that is smaller than the sum of the two battery elements 12-1, 12-2 on the pairs of output terminals 24A to 24D. The charging curve for the capacitor 18, which moves to zero from the sum of the voltages of the present battery element and the previous battery element, means that other voltages can be produced on average over time by means of suitable changeover at a particular position on this curve. Regulation that is required for this purpose corresponds to pure voltage regulation at the output and is therefore very inexpensive. Current measurement is not required. However, it is still simplest to produce the voltages provided by the battery elements 12-1, 12-2.

It is intended to be understood that the presented battery system 10 can also be used for any number of battery elements, which can also provide voltage elements of different magnitude via respective center taps, and any number of pairs of output terminals. Even in the case of such an extended battery system, the capacitive coupling caters for automatic even loading of the battery elements.

Figure 5:
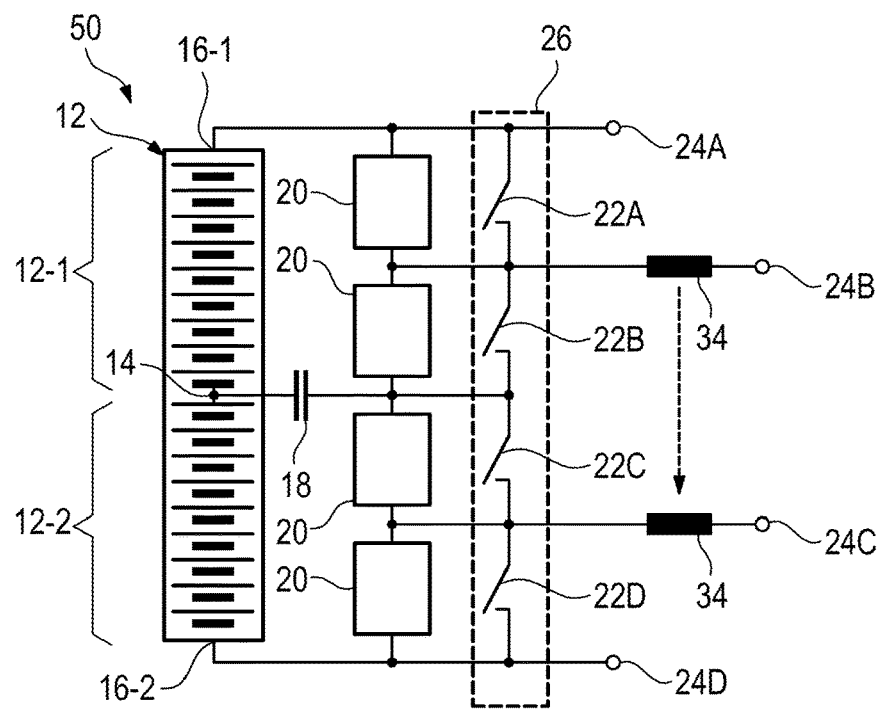
FIG. 5 shows a further embodiment of a battery system according to aspects of the invention.

FIG. 5 shows an extended battery system 50 from the battery system 10, which decouples the alternating voltages from the output terminals 24A to 24D in order to produce an even output voltage. To this end, the battery system 50 additionally has a respective inductance 34 on the output terminals 24B and 24C. An inductance 34 on an output terminal 24B or 24C would be sufficient to produce an even output voltage, but more advantageous is a symmetrical design with a respective inductance 34 on each output terminal 24B, 24C. The battery system 50 is advantageously used to decouple the voltage fluctuations from the pair of output terminals 24B, 24C, which provides a smooth and approximately constant voltage on the pair of output terminals 24B, 24C and hence loads connected thereto (or a charging column for charging the battery). With appropriate current regulation in the battery system 50, a constant current would be available on the pair of output terminals 24B, 24C. In some circumstances, the inductances 34 together with the capacitor 18 can be used to form oscillators that make it possible to set the changeover duration independently of the load current.

Figure 6:
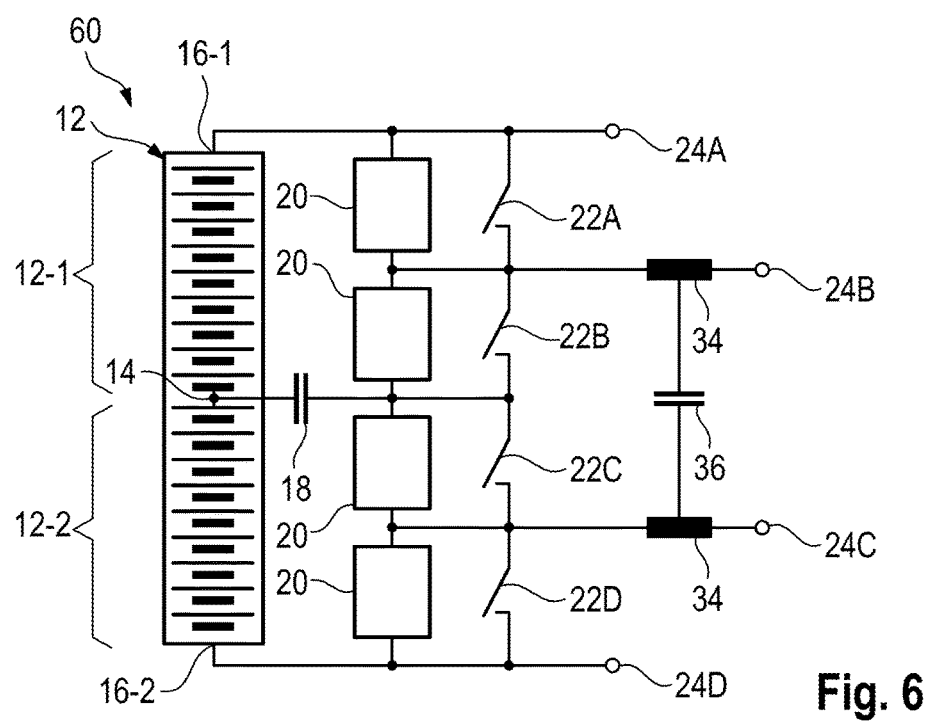
FIG. 6 shows a further embodiment of a battery system according to aspects of the invention, which is an extension of the battery system from FIG. 5.

FIG. 6 shows an extended battery system 60 from the battery system 50 from FIG. 5. An additional capacitor 36 that is connected between the output terminals 24B, 24C can be used to additionally equalize the voltage fluctuations. In principle, the capacitor 36 in FIG. 6 could also be arranged on the left of the inductances 24, but this would prompt a slower equalization current in the capacitor 36 for each changeover process if the high sudden voltage changes (see FIGS. 3a and 3b) occurred. Furthermore, the high current peaks that then arise could place great stress on the switching elements 22A to 22D. Provision is made for the capacitor 36 to be able to be polarized, i.e. an anode of the capacitor 36 represents a negative pole and a cathode of the capacitor 36 represents a positive pole, for example. A combination of capacitances 36 and inductances 34 allows the commutation and switching dynamics to be set more accurately. In this case, the inductances 34 of the currently active terminal pair 24B, 24C and the capacitance 18 of the currently active battery tap (in the case of more than two battery elements 12-1, 12-2) form a series resonant circuit whose half period duration determines the changeover rate and that additionally results in a comparatively smooth current and/or voltage profile on the output terminals 24A to 24D.

Figure 7:
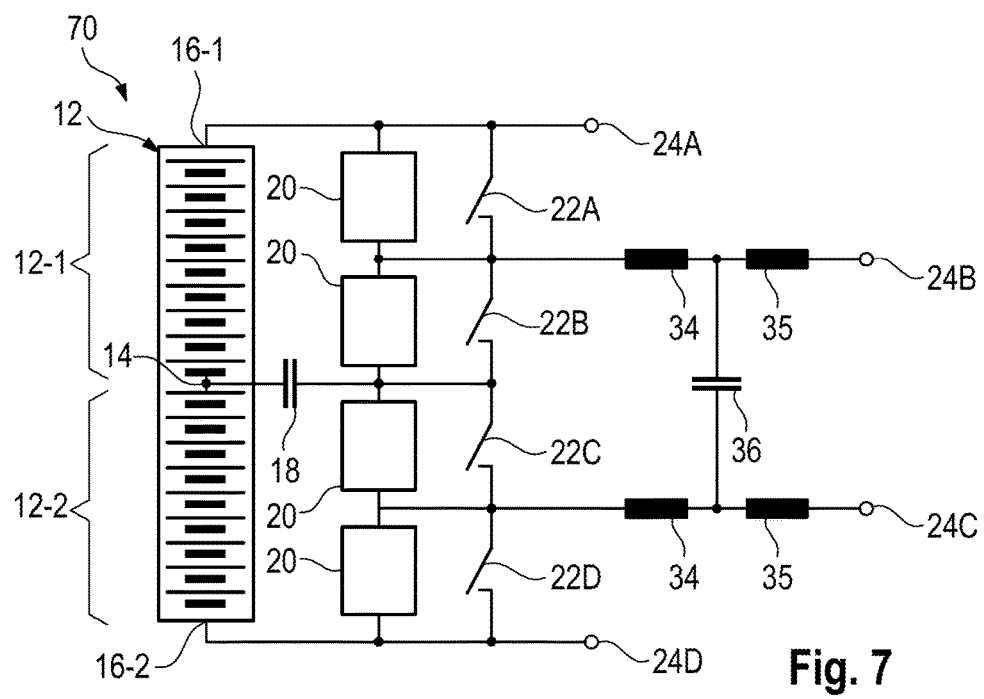
FIG. 7 shows a further embodiment of the battery system according to aspects of the invention, which is an extension of the battery system from FIG. 6.

FIG. 7 shows an extended battery system 70 from the battery system 60 from FIG. 6. The battery system 70 additionally has a second inductance 35 on each of the output terminals 24B and 24C. This gives rise to what is known as an LCL structure with two inductances 34, 35 and a capacitance 36. It is possible for also just one second inductance 35 to be arranged on an output terminal 24B or 24C. A symmetrical design with two second inductances 35 on each output terminal 24B and 24C is advantageous, however. The inductances 34, 35 cater for an even flow of current.

For loads that are not purely resistive and that are connected to the output terminals 24A to 24D, particularly loads with a storage capability (for example inductances and/or capacitances), a zero crossing in the current and a zero crossing in the voltage do not necessarily occur at the same time anymore. To diminish losses, a controller can preferably use one of the two times from a current zero crossing or a voltage zero crossing for changeover processes. A changeover with just a small current and/or voltage through one or more of the relevant switching elements 22A to 22D also increase the efficiency to a significant degree. In this case, the term "small current" or "small voltage" means a current or a voltage that is smaller than a rated current or a rated voltage that would be present in a system without a ZCS or ZVS capability, according to aspects of the invention, in the circuit. The invention provides for a switching process to take place when an absolute value of the current and/or the voltage across the respective switching elements is close to zero, i.e. when the absolute value is lower than one fifth of the rated value, preferably lower than one fiftieth of the rated value.

Figure 8A:
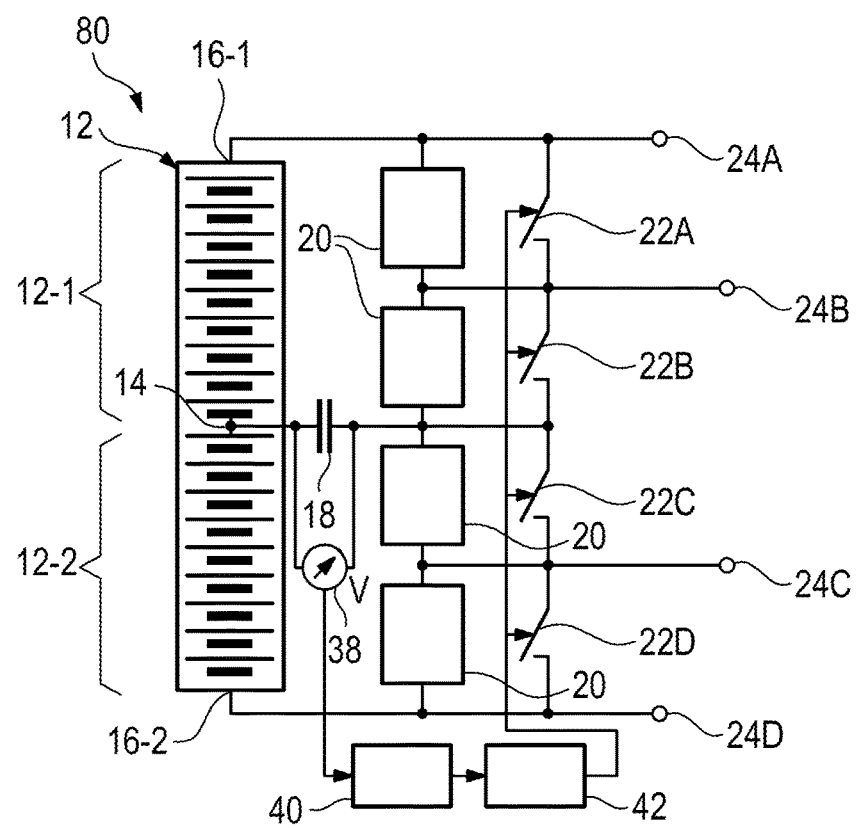
FIG. 8a shows a further embodiment of a battery system according to aspects of the invention.
Figure 8B:
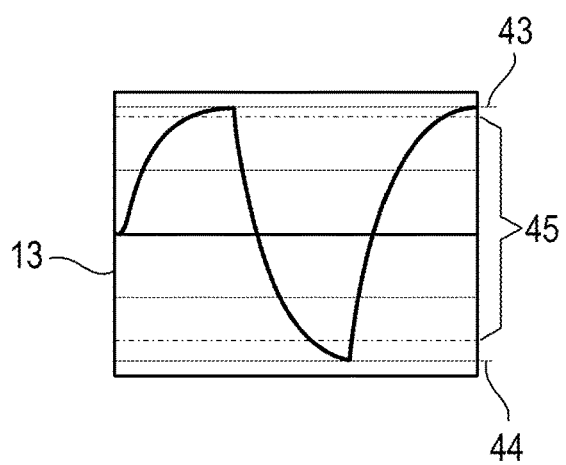
FIG. 8b shows a graph for the time profile of a store voltage.

FIG. 8a therefore shows a battery system 80 that has voltage regulation. To this end, the battery system 10 according to aspects of the invention from FIG. 1 has been extended with a voltmeter 38, a threshold value switch 40 and a switch controller 42 in order to arrive at the battery system 80. In this case, the voltmeter 38 measures a value of a capacitor voltage that is present across the capacitor 18. The measured value of the capacitor voltage is forwarded to a threshold value switch 40 that receives the value. The threshold value switch 40 is designed to send a changeover signal to the switch controller 42 when the capacitor voltage reaches an upper changeover threshold 43 or a lower changeover threshold 44, as shown in FIG. 8b. FIG. 8b shows a time profile of the capacitor voltage (on the ordinate 13) between the upper changeover threshold 43 and the lower changeover threshold 44. The changeover signal indicates to the switch controller 42 the need to switch the switching elements 22A to 22D as appropriate in order to change over to a different battery element 12-1, 12-2. In this case, there is a band of tolerance 45 between the upper and lower changeover thresholds 43, 44 that is just below the voltage element provided by the relevant battery element 12-1, 12-2, for example.

Figure 9:
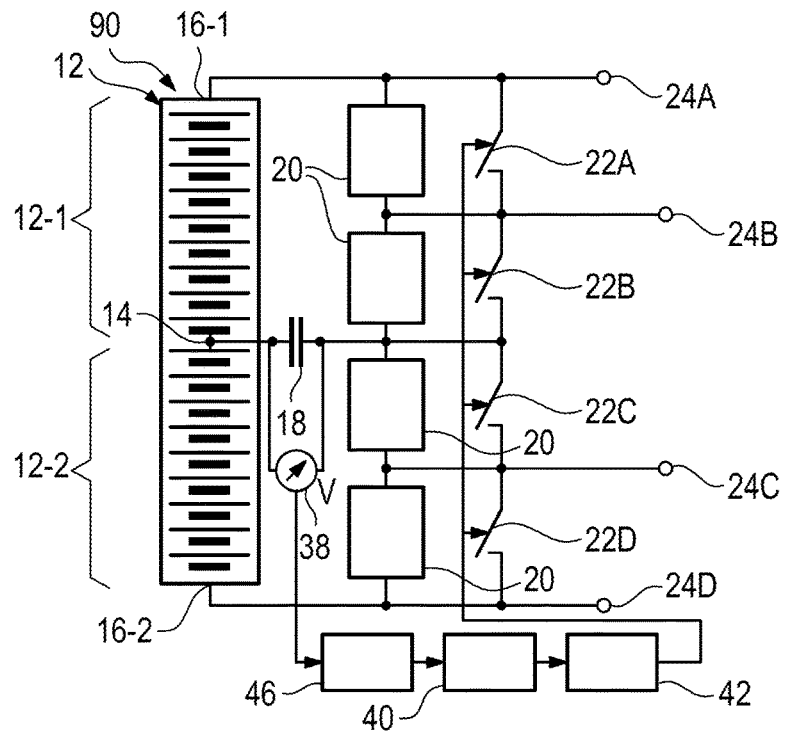
FIG. 9 shows a further embodiment of a battery system according to aspects of the invention.

The embodiment shown in FIG. 8 for the battery system 80 can be used to regulate the changeover using the voltage. FIG. 9 shows a battery system 90 that has a regulator that permits specific changeover for a small or ceased flow of current. To this end, the battery system 90 has an additional differentiator 46 that now receives the measured value of the capacitor voltage from the voltmeter 38 instead of the threshold value switch 40. Since the flow of current through the capacitor 18 is proportional to a time derivative for the voltage, the differentiator 46 provides a value of the current that flows through the capacitor. This value is then received by the threshold value switch 40, which in turn instructs the switch controller 42 to switch the switching elements 22A to 22D in order to prompt a changeover to a correspondingly different battery element 12-1, 12-2 for a small or ceased flow of current, that is to say for a flow of current that is close to zero. Provision is made for a switching process of the switching elements to take place for an absolute value of the current that is lower than one fifth, but particularly lower than one fiftieth, of the rated value of the current.

Figure 10:
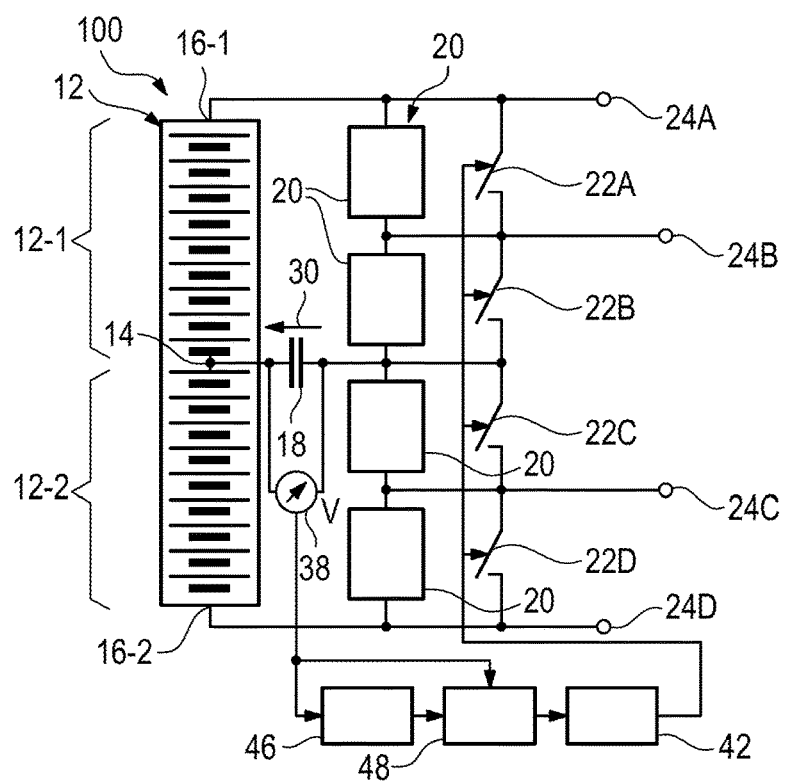
FIG. 10 shows a further embodiment of a battery system according to aspects of the invention.

FIG. 10 shows a battery system 100 that, to a certain extent, is a combination of the battery system 80 from FIG. 8 and the battery system 90 from FIG. 9. The value of the capacitor voltage that is measured by the voltmeter 38 is received by the differentiator 46 and a combinational logic unit 48. The value of the current provided by the differentiator 46 is in this case used as a stop in order to change over preferably only at low currents close to zero. In this case, changeover can also be effected at a high changeover rate in the case of low currents.

As a reminder, it should once again be pointed out that changeover at high currents produces current losses, and energy losses in the form of heat arise. Both losses give rise to costs. An imbalance in the charging and discharging and/or loading of the battery 12 also gives rise to costs, for example as a result of specific discharge of a battery element 12-1, 12-2 in order to produce an equilibrium (balancing). The switch controller 42 is designed to compute a factor that indicates which variant is cheaper, that is to say gives rise to lower costs. The factor thus indicates whether a changeover to a different battery element 12-1, 12-2 gives rise to lower costs than continuing to remain in a present circuit state, or whether the present circuit state gives rise to lower costs than changing over to a different battery element 12-1, 12-2. The switch controller 42 prompts a changeover if a cost advantage is attained.

This factor may be of predictive design, i.e. the computed factor is assessed for a certain time range in the future. This time range can be a few milliseconds to a few seconds. In this case, an assessment for the future is based on the almost constant currents when the battery 12 is in a charging mode, and when power is being drawn from the battery 12 by dynamic loads that are connected to the output terminals 24A to 24D, it is based on the average powers of the loads.

The presented battery systems 10, 50, 60, 70, 80, 90, 100 according to aspects of the invention permit the use of semiconductors that cannot be actively switched off but allow a high power density and low losses, since commutation causes automatic switch-off. Examples of such semiconductor elements are thyristors, triacs, etc.

On account of the slowly decreasing currents and/or voltages before the changeover process, there are no large current and/or voltage transients during the changeover process that could lead to capacitive or inductive emission of electromagnetic waves. Electromagnetic compatibility or electromagnetic interference is referred to in this case. Instead, the well-defined and slower dynamics of the ZCS/ZVS circuit define the switch-off response, which can be shaped to be many orders of magnitude lower on account of the small time derivatives.

The almost current- and/or voltage-free changeover of the power switches also means that it is not necessary for a significant flow of current to be maintained during the changeover by means of protective circuitry so that the relevant switching elements are not destroyed, and/or the interval from the maximum off-state voltage of the semiconductor switching element is so great on account of the low voltage at the changeover time that the situation is much less harmful.

The changeover at low current and/or voltage at the changeover time on a switching element effectively reduces the switching losses by a factor of greater than 1 and allows a high changeover rate for negligibly low switching losses. Owing to the capacitive coupling of the battery taps 14 to the switching-loss-free response, the capacitive store 18 enforces almost perfect equalization of the charge draw at the individual battery taps 14, 16-1, 16-2. In particular, the charge equalization takes place at load currents that fluctuate greatly over time.

What is claimed is:
1. A battery system comprising:
 a battery having at least one first battery element, at least one second battery element and a center tap between the at least one first battery element and the at least one second battery element,
 a power changeover switch having a plurality of switching elements for changing over between the at least one first battery element and the at least one second battery element, and
 at least one pair of output terminals that is electrically connected to the battery,
 wherein the center tap has a first capacitive store arranged on it that has a store voltage that appears over a time period in accordance with a first or second battery element voltage provided by the first or second battery element,
 wherein during the time period in which the store voltage appears, a store current decreases from a maximum value to a value of zero, wherein changeover of at least one of the plurality of switching elements for the purpose of changeover from the at least one first battery element to the at least one second battery element can be performed at a time at which the store current is about zero and the store voltage has reached a maximum value,
 wherein the center tap is configured to output the store voltage which has a different magnitude then the first or second battery element voltage.

2. The battery system as claimed in c n which the switching elements are low frequency changeover switches.

3. The battery system as claimed in claim 1, in which at least one output terminal from the at least one pair of output terminals has at least one first inductance.

4. The battery system as claimed in claim 3, in which a second capacitive store is arranged between the at least one pair of output terminals.

5. The battery system as claimed in claim 4, in which the second capacitive store is arranged upstream or downstream of the respective at beast one first inductance of the output terminals each time.

6. The battery system as claimed in claim 5, in which the second capacitive re is a polar capacitor that has a positive pole and a negative pole.

7. The battery system as claimed in claim 4, in which each output terminal from the at least one pair of output terminals has a second inductance, wherein the second capacitive store is arranged between the first and second inductances.

8. The battery system as claimed in claim 1, in which the first capacitive store has a voltmeter for measuring a store voltage arranged on the first capacitive store.

9. The battery system as claimed in claim 8 further comprising a threshold value switch that is configured to receive the measured store voltage, wherein the threshold value switch instructs a switch controller to switch at least one switching element from the plurality of switching elements as soon as the store voltage reaches an upper or lower changeover threshold value.

10. The battery system as claimed in claim 8 further comprising a differentiator that is configured to receive and process the value of the measured store voltage, wherein the processed value can be forwarded to a threshold value switch that is configured to instruct a switch controller to switch at least one switching element from the plurality of switching elements as soon as the processed value reaches an upper or lower changeover threshold value.

11. The battery system as claimed in claim 8, in which the value of the measured store voltage can be supplied to a differentiator and a combinational logic unit, wherein a switch controller is configured to ascertain a factor for a mode of the battery system in a present circuit state and to ascertain a factor for a mode of the battery system in a circuit state after a changeover, wherein the switch controller is configured to instruct the switching elements or the power changeover switch to set the mode of the battery system for which the ascertained factor is lower.

12. The battery system as claimed in claim 11, in which the switch controller is configured to assess the factor for a period of time occurring after the changeover.

13. The battery system as claimed in claim 12, in which the period is between approximately one millisecond and approximately five seconds in the future.

14. A method for low-loss or loss-free changeover of at least one switching element in a battery system having a battery comprising at least one first battery element, at least one second battery element and a center tap, a power changeover switch having the at least one switching element and at least one pair of output terminals that is connected to the battery, in which the center tap is assigned a capacitive store that is charged to a store voltage over a time period using a voltage element that is provided by the first battery element or second battery element, wherein during a time period in which the store voltage is charged and a store current decreases from a maximum value to a value of zero, the method comprises the step of:

switching at least one of the plurality of switching elements for switching from the at least one first battery element to the at least one second battery element at a time when the store current is about zero and the store voltage has reached a maximum value; and outputting the store voltage using the center tag, the store voltage having a different magnitude then the first or second battery element voltage.

15. The method as claimed in claim 14, in which the switching elements are low frequency changeover switches.

16. The method as claimed in claim 14, in which the at least one pair of output terminals has an approximately constant and smooth voltage provided on it by arranging at least one first inductance on at least one output terminal from the at least one pair of output terminals.

17. The method as claimed in claim 16, in which the at least one pair of output terminals has a second capacitive store arranged between them.

18. The method as claimed in claim 17, in which the second capacitive store is arranged upstream or downstream of the respective at least one first inductance each time.

19. The method as claimed in, claim 17, which the second capacitive store is a polar capacitor that has a positive pole and a negative pole.

20. The method as claimed in claim 17, in which at least one output terminal has at least one second inductance arranged on it and the second capacitive store is arranged between the first and the second inductance.

21. The method as claimed in claim 14, in which the first capacitive store has a voltmeter for measuring a store voltage of the first capacitive store.

22. The method as claimed in claim 21, in which a threshold value switch receives the measured store voltage, wherein the threshold value switch instructs a switch controller to change over at least one switching element from the plurality of switching elements as soon as the store voltage reaches an upper or a lower changeover threshold value.

23. The method as claimed in claim 21, in which a differentiator receives and processes the value of the measured store voltage, wherein the processed value is forwarded to a threshold value switch that instructs a switch controller to change over at least one switching element from the plurality of switching elements as soon as the processed value reaches an upper or a lower changeover threshold value.

24. The method as claimed in claim 21, in which the value of the measured store voltage is supplied to a differentiator and a combinational mathematics unit, wherein a switch controller ascertains a factor for a mode of the battery system in a present circuit state and a factor for a mode of the battery system in a circuit state after a changeover, wherein the switch controller instructs the switching elements or the power changeover switch to set the mode of the battery system for which the ascertained factor is lower.

25. The method as claimed in claim 24, which the switch controller assesses the factor for a period of time occurring after the changeover.

* * * * *